(12) United States Patent
Brennan et al.

(10) Patent No.: US 8,475,009 B2
(45) Date of Patent: Jul. 2, 2013

(54) TAILORED SIDE-EMITTER PERIMETER BEACON

(75) Inventors: Kevin Brennan, Villa Park, IL (US); Wei Li, South Barrington, IL (US)

(73) Assignee: Excelitas Technologies Corp., Waltham, MA (US)

( * ) Notice: Subject to any disclaimer, the term of this patent is extended or adjusted under 35 U.S.C. 154(b) by 293 days.

(21) Appl. No.: 12/832,216

(22) Filed: Jul. 8, 2010

(65) Prior Publication Data

US 2012/0008327 A1   Jan. 12, 2012

(51) Int. Cl.
*F21V 7/04* (2006.01)
*F21V 5/04* (2006.01)

(52) U.S. Cl.
USPC .............. 362/309; 362/311.02; 362/311.12; 362/329

(58) Field of Classification Search
USPC ............ 362/308–310, 311.02, 311.12, 296.1, 362/327, 329, 339, 340
See application file for complete search history.

(56) References Cited

U.S. PATENT DOCUMENTS

| | | | |
|---|---|---|---|
| 6,981,784 B2 | 1/2006 | Dubuc | 362/331 |
| 7,168,827 B2 | 1/2007 | Stein et al. | 362/299 |
| 7,322,721 B2 * | 1/2008 | Noh et al. | 362/327 |
| 7,942,556 B2 * | 5/2011 | Harbers et al. | 362/294 |
| 2002/0136027 A1 | 9/2002 | Hansler | |
| 2007/0041098 A1 * | 2/2007 | Kim et al. | 359/642 |
| 2008/0013325 A1 * | 1/2008 | Shiau et al. | 362/326 |
| 2009/0129097 A1 * | 5/2009 | Ewert et al. | 362/328 |

FOREIGN PATENT DOCUMENTS

JP   2001023405 A   1/2001

OTHER PUBLICATIONS

Webpage for Heliport Flushlight Model 1601 by Flight Light Inc. (2008).
Webpage for Heliport Perimeter Inset Light Model ZA292 by Flight Light Inc. (2008).
Jastram Helideck Equipment Catalog (Jun. 2005).
Data Sheet for Green LED Helideck Perimeter Light IHP 150 by ITO Vaarwegmarkering BV (Jul. 8, 2010).

* cited by examiner

*Primary Examiner* — Thomas Sember
(74) *Attorney, Agent, or Firm* — Peter A. Nieves; Sheehan Phinney Bass + Green PA

(57) ABSTRACT

An optical element for a side emitting light that emits light from a light source at side directions relative to the horizon is disclosed. The optical element has an internal recess adapted to fit over a light source. The internal recess includes a collimating surface and interior refractive surfaces. An exterior refractive surface corresponding to the interior refractive surfaces is provided. A faceted prismatic reflecting surface corresponding with the collimating surface is provided. Light at a substantially horizontal angle relative to the horizon is emitted through the interior refractive surface through the exterior reflective surface to a side direction and light at a substantially vertical angle relative to the horizon is collimated by the collimating surface and reflected by the reflecting surface in the side direction.

18 Claims, 3 Drawing Sheets

TAILORED SIDE-EMITTER PERIMETER BEACON

TECHNICAL FIELD

The present invention relates to high intensity lights, and more specifically to a tailored, LED, side-emitter perimeter beacon light.

BACKGROUND

High intensity lights are needed for applications such as helideck beacons. In the past such beacons have been conventional filament lights. However, filament lights are energy and maintenance intensive. Recently, beacons have used light emitting diodes ("LED") in conjunction with optical elements to channel the emitted light. LEDs create unique requirements in order to be commercially viable in terms of size, weight, price, and cost of ownership, compared to conventional filament lights, but are more energy efficient and require less maintenance.

The light emission of helideck perimeter lights is controlled by international aeronautical regulations, namely the Civil Aviation Authority's "CAP 437" standard. The intensity requirements over 360° of the azimuth for helideck perimeter beacon lights are given in terms of elevation angles from the horizon (0° being at the horizon and 90° being the straight vertical): a 60 candela maximum for 0° to 90°, a 3 candela minimum for 20° to 90°, a 15 candela minimum for 10° to 20° and a 30 candela minimum for 0° to 10°. In current LED based designs, LED signals/beacons requiring an omni-directional light profile which primarily emit light in a substantially horizontal plane have used multiple optical elements to translate the light emitted from the LED (that is a near-Lambertian source) into the required emission pattern. Such beacons are required to have a battery back-up. However, the multiple optical elements result in loss of light emitted from the LED and therefore result in greater than necessary battery drain if in a back-up mode.

Current helideck light designs using LEDs suffer from complex manufacturing requirements due to the multiple optical elements required. Further, these light designs are not efficient, because light passing through or reflecting off of multiple media results in loss of light and therefore inefficient use of energy. A superior helideck light design would exhibit a low cost of manufacture and high energy efficiency to satisfy the additional requirement for installations to have a battery back-up.

SUMMARY

One example relates to a high intensity side emitting light including a base member and a light source mounted on the base member. A total internal reflection optical element is mounted over the light source. The optical element has an internal recess with internal entry faces including a collimating surface and an interior refractive surface, a faceted prismatic reflecting surface corresponding with the collimating surface, and a plurality of exterior refraction surfaces. Substantially all light from the light source incident upon each of the internal entry faces is refracted or reflected into a substantially side direction relative to the horizon.

Another example is a total internal reflection optical element for emitting light in side directions. The element has an internal recess adapted to fit over a light source. The internal recess includes a collimating surface and interior refractive surfaces. An exterior refractive surface corresponds to the interior refractive surfaces. A faceted prismatic reflecting surface corresponds with the collimating surface. Light at a substantially horizontal angle relative to the horizon is emitted through the interior refractive surface through the exterior reflective surface to a side direction. Light at a substantially vertical angle relative to the horizon is collimated by the collimating surface and reflected by the reflecting surface in the side direction.

Another example is a method of fabricating a total internal reflection optical element for emitting light in side directions. An internal recess adapted to fit over a light source is formed. The internal recess includes a collimating surface and interior refractive surfaces. An exterior refractive surface corresponding to the interior refractive surfaces is formed. A faceted prismatic reflecting surface corresponding with the collimating surface is formed. Light at a substantially horizontal angle relative to the horizon is emitted through the interior refractive surface through the exterior reflective surface to a side direction. Light at a substantially vertical angle relative to the horizon is collimated by the collimating surface and reflected by the reflecting surface in the side direction.

Additional aspects will be apparent to those of ordinary skill in the art in view of the detailed description of various embodiments, which is made with reference to the drawings, a brief description of which is provided below.

Figure 1:
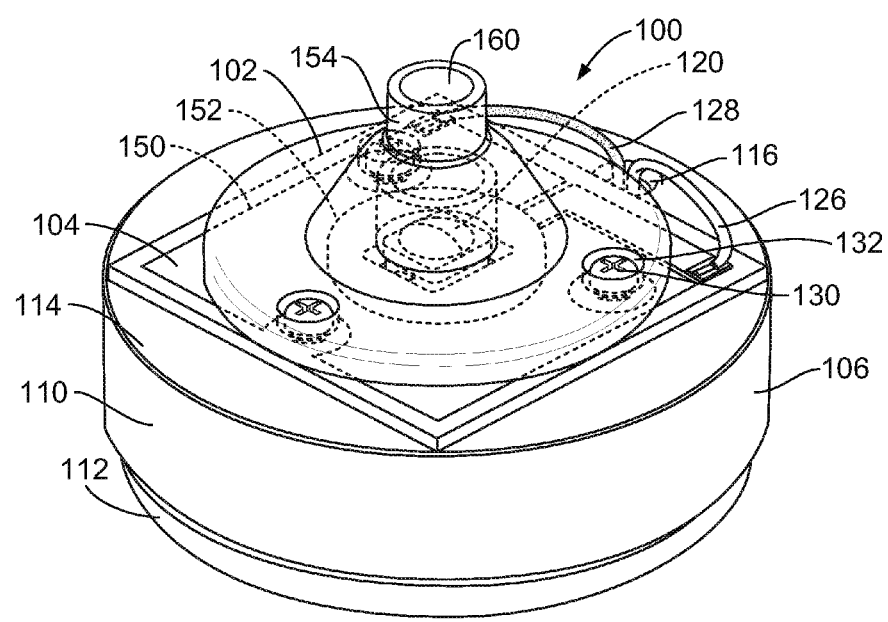
FIG. 1 is a perspective diagram of an example LED based side emitter beacon with a single optical element to translate the light from the LED to a side emission pattern.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

FIG. 1 shows the exterior of an example high intensity LED based beacon 100 that emits light in a primarily side or horizontal direction relative to the horizon. In this example, the LED based beacon 100 may be used as a helideck light in accord with applicable FAA and ICAO standards such as the CAP 437 standard. The beacon 100 includes an optical element 102, a circuit board 104 and a base member 106.

Figure 2:
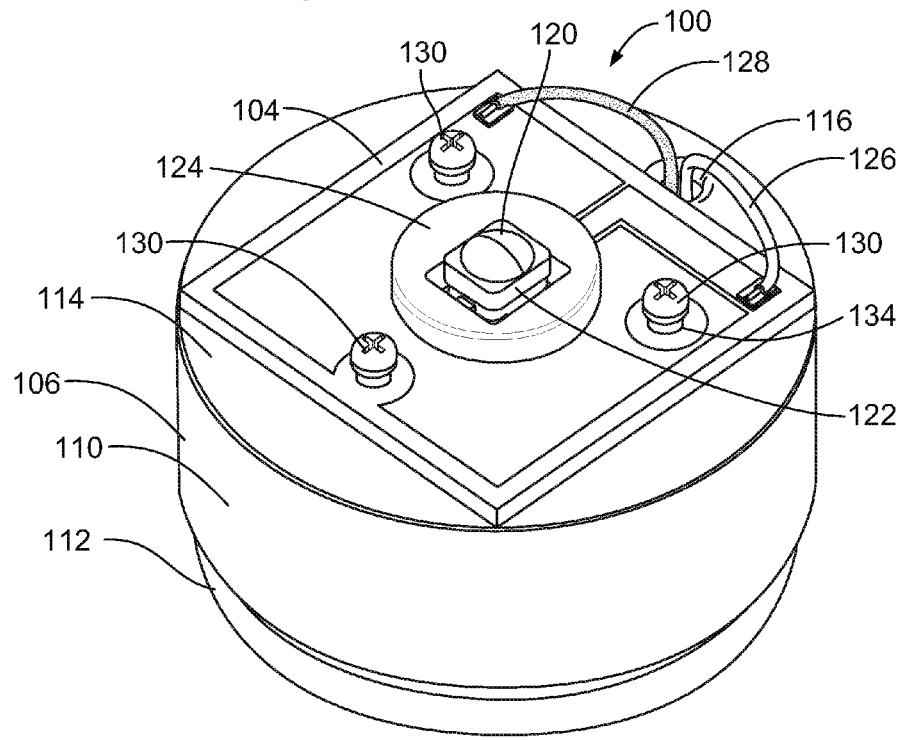
FIG. 2 is a perspective view of the example beacon in FIG. 1 with the optical element removed for illustration.
Figure 3:
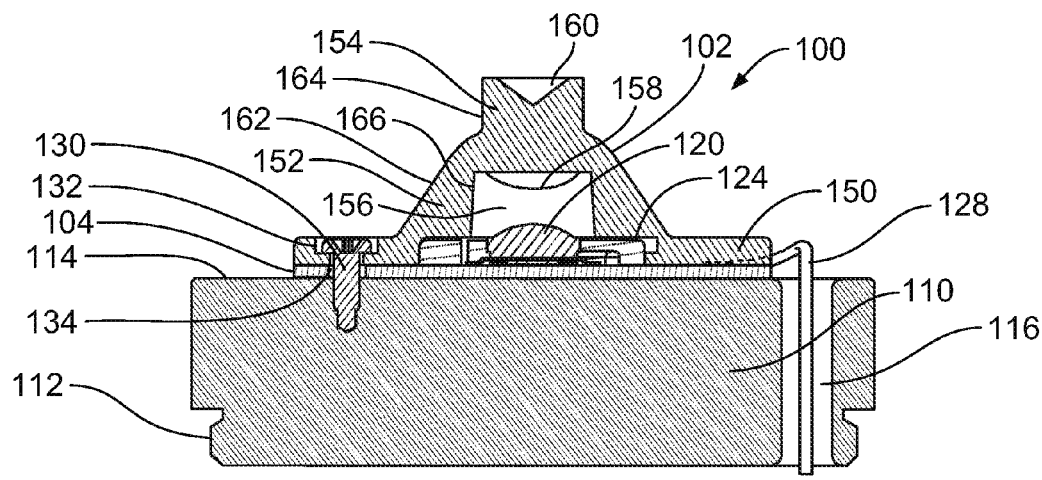
FIG. 3 is a side view of the example beacon in FIG. 1.

FIG. 2 is a perspective view of the beacon 100 with the optical element 102 removed for illustrative purposes. The base member 106 includes a cylindrical heat sink 110 mounted on a base plate 112. The heat sink 110 has a circular top surface 114. The top surface 114 has a wiring conduit 116 that runs throughout the heat sink 110 and the base member 106.

The circuit board 104 supports a light source such as an LED 120 that is mounted on a die package 122 that is mounted on the circuit board 104 and surrounded by a circular locating ring 124. The LED 120 draws power from a power wire 126 and a ground wire 128. The power and ground wires 126 and 128 are attached to the circuit board 104 via electrical contacts. The circuit board 104 has a conductor pathway pattern that provides electrical connections between the power and ground wires 126 and 128 and the LED 120. The power and ground wires 126 and 128 run through the wiring conduit 116 down through the base member 106 and are attached to a power source and an optional battery (not shown).

In this example, the LED 120 is preferably a commercially available "high brightness" light emitting diode, preferably green, red, yellow, or other color, with color chromaticity meeting ICAO and FAA requirements in this example, but other LED types may be used for other applications. The circuit board 104 which, in this example, is a thermally conductive printed circuit board (PCB), preferably having a metal core of aluminum, a thin dielectric layer, and a copper layer defining the electrical pathways coupled to the power and ground wires 126 and 128. The LED die package 122 is preferably attached to the circuit board 104 using solder, eutectic bonding, or thermally conductive adhesive.

In this example as shown in FIG. 1, the mounting screws 130 are inserted through holes 132 in the optical element 102 and the holes 134 in the printed circuit board 104 to attach the optical element 102 and the printed circuit board 104 to the top surface 114 of the base member 106. The locating ring 124 serves to precisely locate the optical element 102 with respect to the LED die package 122 despite geometric variations in the circuit board mounting holes 134 and the optical element mounting holes 132.

The heat sink 110 conducts heat from the LED 120 and dissipates the conducted heat. In the preferred embodiment, the heat sink 110 is aluminum. Heat is removed from the LED 120 via conduction through the printed circuit board 104, through conductive grease or adhesive to the heat sink 110. A portion of the heat is conducted through the heat sink 110 to the lower base plate 112, from which the heat may be transferred to the ambient air by convection or by conduction to a mounting surface (not shown) upon which the beacon light 100 is attached.

The optical element 102 is a total internal reflection optic that is fabricated from a single piece of light refracting, transparent material such as an acrylic or polycarbonate material for example. "Total Internal Reflection" (TIR) is a phenomena where electromagnetic radiation (light) in a given medium (for example the acrylic or polycarbonate material) incident on the boundary with a less dense medium (for example air), at an angle equal to or larger than the critical angle, is completely reflected from the boundary.

The optical element 102 has a circular base 150. The circular base 150 supports a conically shaped middle member 152 and an upper cylinder 154. The interior of the optical element 102 has a cylindrical recess 156 that is aligned over the LED 120. The cylindrical recess 156 has a number of interior light entry surfaces that receive light from the LED 120. The cylindrical recess 156 is capped by an interior, half-spherical collimating surface 158. The top of the upper cylinder 154 has a sloped reflecting surface 160 that corresponds with the half-spherical collimating surface 158. The sloped reflecting surface 160 is a faceted prismatic reflecting surface in this example that reflects light collimated by the collimating surface 158 in a side direction relative to the horizon. The conically shaped middle member 152 includes an exterior refractive surface 162 while the upper cylinder 154 also includes an exterior refractive surface 164. The recess 156 includes cylindrical interior walls 166 which are also refractive surfaces.

Figure 4:
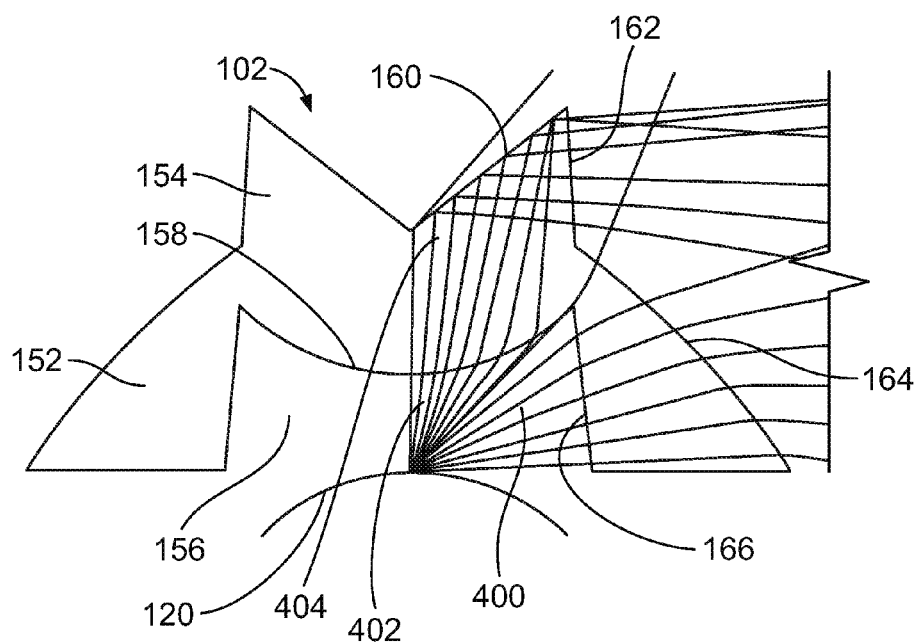
FIG. 4 is a cross-section side view of optical element of the beacon in FIG. 1 showing the ray trace of light through the optical element and from the beacon.

FIG. 4 is an optic ray trace diagram of the light rays emitted from the light emitting diode 120 through the optical element 102. Light rays 400 that are emitted at substantially horizontal angles relative to the surface plane or horizon contact the interior cylindrical interior walls 166 of the cylindrical recess 156. These rays 400 are directed by the sloping exterior refractive surface 164 to be emitted in a largely horizontal or side direction relative to the horizon. Light rays 402 that are emitted at more vertical angles relative to the horizon are emitted through the semi-spherical collimating surface 158 that directs the rays 402 in a largely vertical orientation. The resulting collimated rays 404 contact the faceted prismatic reflecting surface 160 which reflects the rays 404 into a substantially horizontal or side direction from the exterior refractive surface 164. Thus, the light emitted at all angles relative to the horizon from the LED 120 are refracted or reflected to a side direction relative to the horizontal by the various surfaces of the optical element 102.

The proportions of the refractive surfaces 162, 164, and 166, collimating surface 158 and the reflecting surface 160 are adjusted to suit the output of the LED 120 to fit the light emission to the desired requirement such as the CAP 437 requirement.

The one piece optical element 102 does not require external lenses, and its simple axi-symmetric profile is easily molded for manufacturing. Since the single optical element 102 eliminates the need for multiple optical elements, the beacon light 100 increases the light emitted by the optical element 102 by reducing transmission and reflection losses of light from the LED 120.

Figure 5:
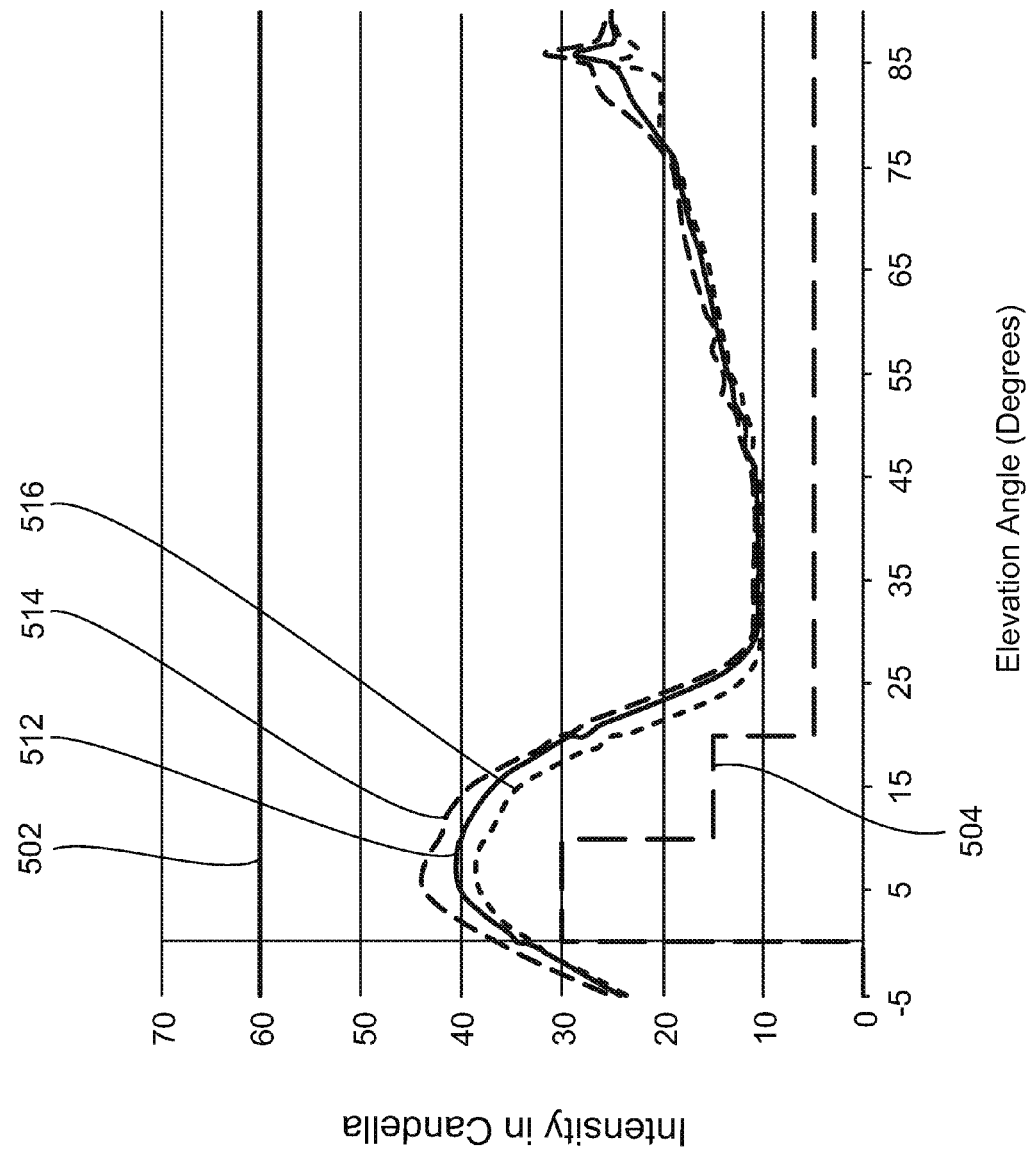
FIG. 5 is a graph showing the elevation intensity of the beacon in FIG. 1 in contrast with required beam intensity levels.

FIG. 5 is a graph of intensity versus the elevation angle for the beacon 100 in FIG. 1 compared to the required intensity to meet with the CAP 437 standard. FIG. 5 includes a maximum intensity requirement line 502 and a minimum intensity requirement line 504 for different elevation angles for complying with the CAP 437 standard. As shown by the requirement lines 502 and 504 in FIG. 5, the intensity of the light from the optical element 102 must be most intense at lower elevations reflecting side or horizontal emissions relative to the horizon. A series of plot lines 512, 514 and 516 represent mean intensity values at different elevation angles for the light emitted by the optical element 102 of the beacon 100 in FIG. 1. The middle line 512 is a trace of the mean intensity values of the light emitted by the LED 120 through the optical element 102 for each elevation angle from the horizon. The upper line 514 is a similar plot of the maximum values and the lower line 516 represents the minimum intensity values. The difference between the maximum and the minimum values is a measure of beam uniformity at any elevation angle. As a result of the optical element 102, the distance between maximum and minimum intensities 514 and 516 readily falls within the limits.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A high intensity side emitting light comprising:
a base member;
a light source mounted on the base member;
a total internal reflection optical element mounted over the light source, the optical element having an internal recess with internal entry faces including a collimating surface and an interior refractive surface, a reflecting surface corresponding with the collimating surface, and a plurality of exterior refraction surfaces;

wherein a substantial amount of light from the light source incident upon each of the internal entry faces is refracted or reflected into a substantially side direction relative to a horizon, wherein the high intensity side emitting light is configured to produce a light intensity profile that includes a 3 candela minimum between 20° and 90° relative to the horizon.

2. The high intensity light of claim 1 wherein the optical member has conical middle section and an upper cylinder, the upper cylinder including the reflecting surface, the exterior surfaces of the middle section and upper cylinder included in the plurality of refractive surfaces, the internal recess including a semi-spherical surface to collimate emitted light from the light source emitted at a substantially vertical direction relative to the horizon.

3. The high intensity light of claim 1 wherein the optical element is fabricated from light refracting, transparent material.

4. The high intensity light of claim 1 wherein the light source is a light emitting diode.

5. The high intensity light of claim 4 wherein the light emitting diode emits green, yellow or red light.

6. The high intensity light of claim 4 further comprising a printed circuit board mounted on the surface of the base member, wherein the base member is a heat sink and the printed circuit board providing power to the light emitting diode.

7. The high intensity light of claim 1 wherein the light intensity profile has a 60 candela maximum between 0° and 90° relative to the horizon, a 15 candela minimum between 10° and 20° relative to the horizon, and a 30 candela minimum between 0° and 10° relative to the horizon.

8. The high intensity light of claim 1 further comprising a circuit board, wherein the base member is on a first side of the circuit board and the light source and the optical element are on a second side of the circuit board opposite the first side.

9. The high intensity light of claim 1 wherein the optical element comprises:

a bottom surface;

a cylindrical interior wall that extends from the bottom surface to define a cylindrical recess; and an interior, half-spherical, collimating surface that caps the cylindrical recess.

10. A total internal reflection optical element for emitting light in side directions, comprising:

an internal recess adapted to fit over a light source, the internal recess including a collimating surface and interior refractive surfaces;

an exterior refractive surface corresponding to the interior refractive surfaces; and a reflecting surface corresponding with the collimating surface;

wherein light at a substantially horizontal angle relative to a horizon is emitted through the interior refractive surface through the exterior reflective surface to a side direction and light at a substantially vertical angle relative to the horizon is collimated by the collimating surface and reflected by the reflecting surface in the side direction, and wherein the optical element is configured to produce a light intensity profile that includes a 3 candela minimum between 20° and 90° relative to the horizon.

11. The optical element of claim 10, wherein the internal recess is formed in a conical main body and the reflecting surface is formed in a cylindrical upper body.

12. The optical element of claim 10, wherein the light source is a light emitting diode.

13. The optical element of claim 12 wherein the light emitting diode emits green, yellow or red light.

14. The optical assembly of claim 11, wherein the optical element is fabricated from light refracting, transparent material.

15. A method of fabricating a total internal reflection optical element for emitting light in side directions, comprising:

forming an internal recess adapted to fit over a light source, the internal recess including a collimating surface and interior refractive surfaces;

forming an exterior refractive surface corresponding to the interior refractive surfaces; and forming a reflecting surface corresponding with the collimating surface, wherein the optical element is configured such that light at a substantially horizontal angle relative to a horizon is emitted through the interior refractive surface through the exterior reflective surface to a side direction and light at a substantially vertical angle relative to the horizon is collimated by the collimating surface and reflected by the reflecting surface in the side direction, and wherein the optical element is further configured to produce a light intensity profile that includes a 3 candela minimum between 20° and 90° relative to the horizon.

16. The method of claim 15, wherein the optical element is fabricated from light refracting, transparent material.

17. A high intensity side emitting light comprising:

a base member;

a light source mounted on the base member; and a total internal reflection optical element mounted over the light source, the optical element having an internal recess with internal entry faces including a collimating surface and an interior refractive surface, a reflecting surface corresponding with the collimating surface, and a plurality of exterior refraction surfaces, wherein the high intensity side emitting light is configured to produce a light intensity profile that includes a 3 candela minimum between 20° and 90° relative to a horizon.

18. A high intensity side emitting light comprising:

a base member;

a light source mounted on the base member; and a total internal reflection optical element mounted over the light source, the optical element having an internal recess with internal entry faces including a collimating surface and an interior refractive surface, a reflecting surface corresponding with the collimating surface, and a plurality of exterior refraction surfaces, a locating ring that serves to precisely locates the optical element with respect to the light source despite geometric variations of circuit board mounting holes and optical element mounting holes, wherein the high intensity side emitting light is configured to produce a light intensity profile that includes a 3 candela minimum between 20° and 90° relative to a horizon.

* * * * *